E. L. ROMICK.
CEREAL GRINDING AND GRANULATING MILL.
APPLICATION FILED FEB. 8, 1913.

1,115,245.

Patented Oct. 27, 1914.
4 SHEETS—SHEET 2.

WITNESSES:
B Jones
J H Hayes

INVENTOR
Elias L. Romick
BY George W. Upton
Attorney.

E. L. ROMICK.
CEREAL GRINDING AND GRANULATING MILL.
APPLICATION FILED FEB. 8, 1913.

1,115,245.

Patented Oct. 27, 1914.
4 SHEETS—SHEET 3.

WITNESSES:
B. Jones
J. H. Hayes

INVENTOR
Elias L. Romick
BY George W. Upton
Attorney

E. L. ROMICK.
CEREAL GRINDING AND GRANULATING MILL.
APPLICATION FILED FEB. 8, 1913.

1,115,245.

Patented Oct. 27, 1914.
4 SHEETS—SHEET 4.

WITNESSES:
B. Jones
J. F. Hayes

INVENTOR
Elias L. Romick
BY George W. Upton
Attorney

UNITED STATES PATENT OFFICE.

ELIAS L. ROMICK, OF NILES, OHIO.

CEREAL GRINDING AND GRANULATING MILL.

1,115,245.    Specification of Letters Patent.    Patented Oct. 27, 1914.

Application filed February 8, 1913. Serial No. 747,009.

*To all whom it may concern:*

Be it known that I, ELIAS L. ROMICK, a citizen of the United States of America, residing at Niles, in the county of Trumbull and State of Ohio, have invented certain new and useful Improvements in Cereal Grinding and Granulating Mills, of which the following is a specification.

My invention relates to improvements in cereal grinding and granulating mills in which middlings are converted into flour, or in which rye, rice or other cereals are granulated; and the objects of my invention are primarily to increase the amount of pure flour produced from a given amount of wheat or middlings, second to increase the percentage of protein and gluten retained in the flour and saved from going over with the bran and other undesirable residue, third, to more evenly and quickly feed the cereal to the grinding mechanism, and, fourth, to reduce the time required to produce a given output proportionately to the number of revolutions of the grinding mechanism. I attain these objects by the mechanism illustrated in the accompanying drawings, in which—

Figure 1:
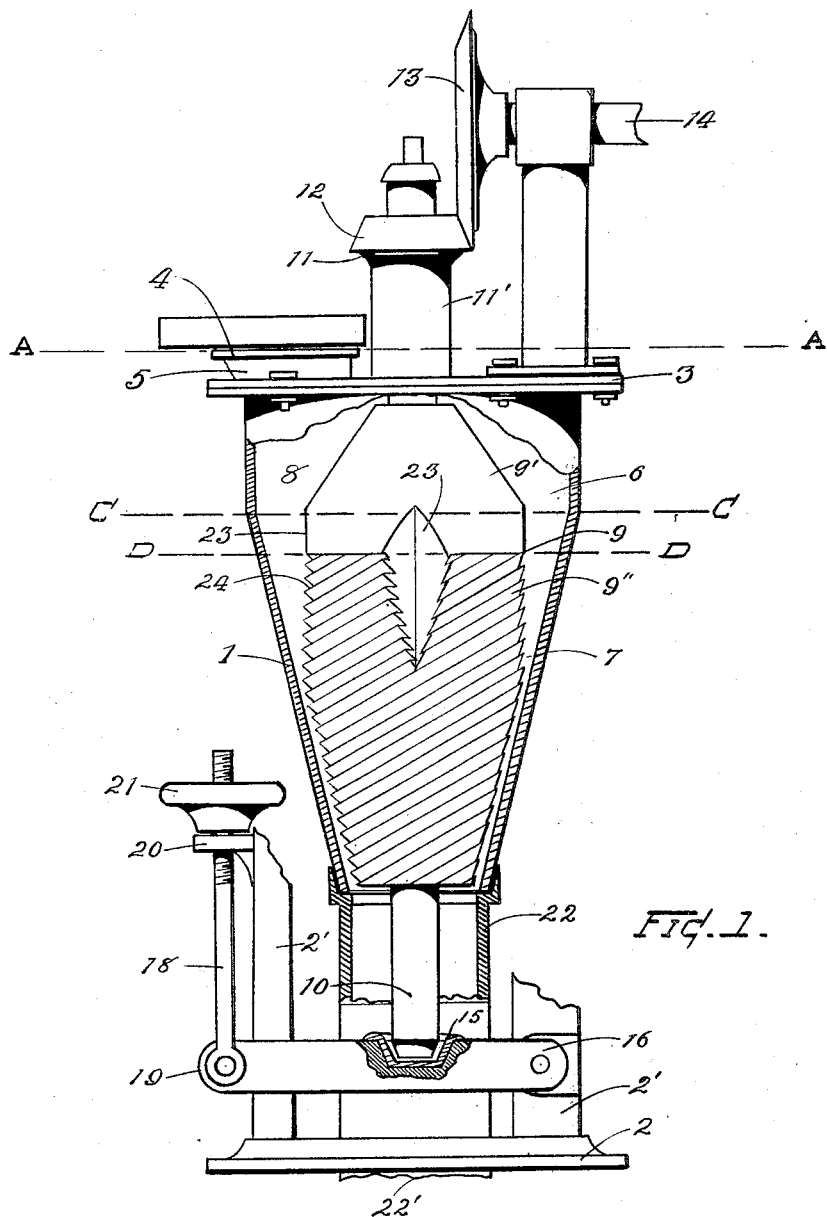
Figure 2:
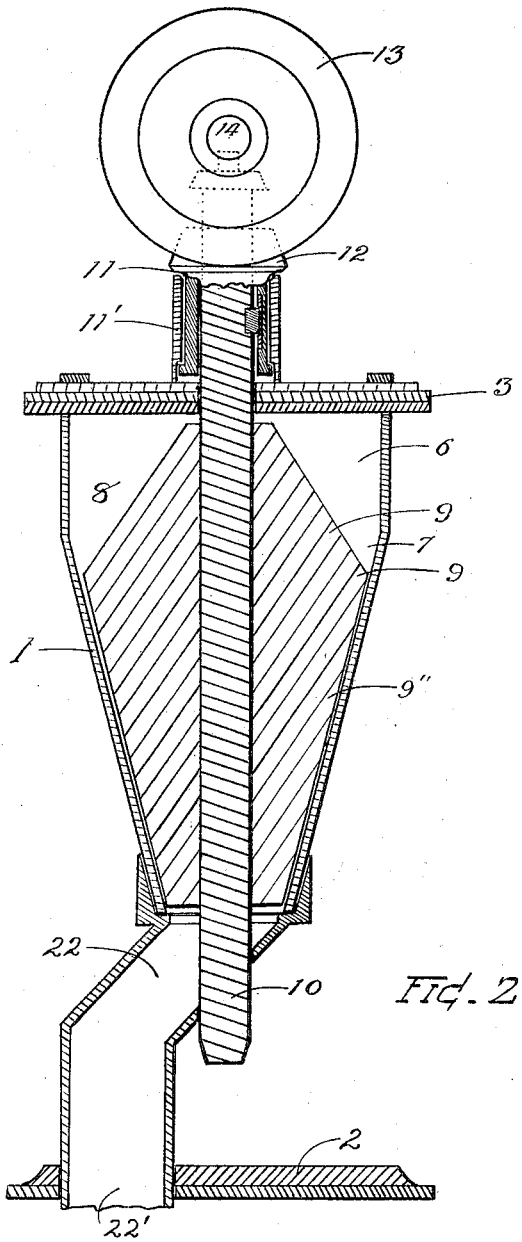
Figure 3:
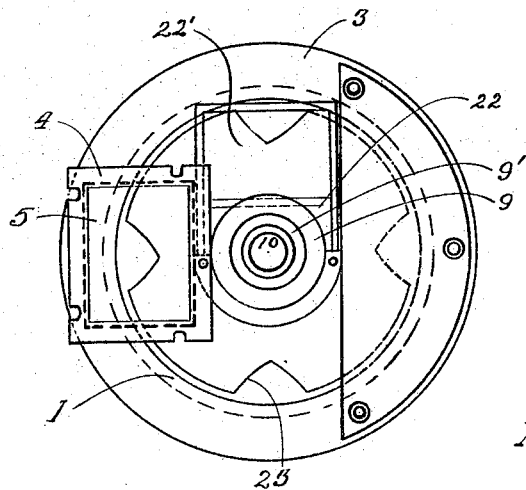
Figure 5:
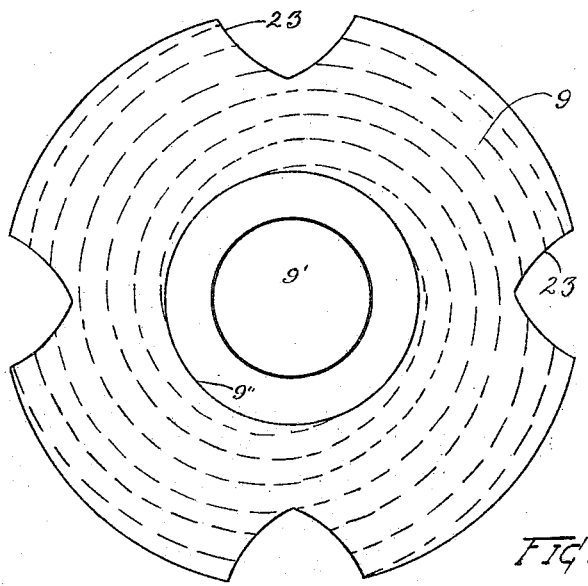
Figure 4:
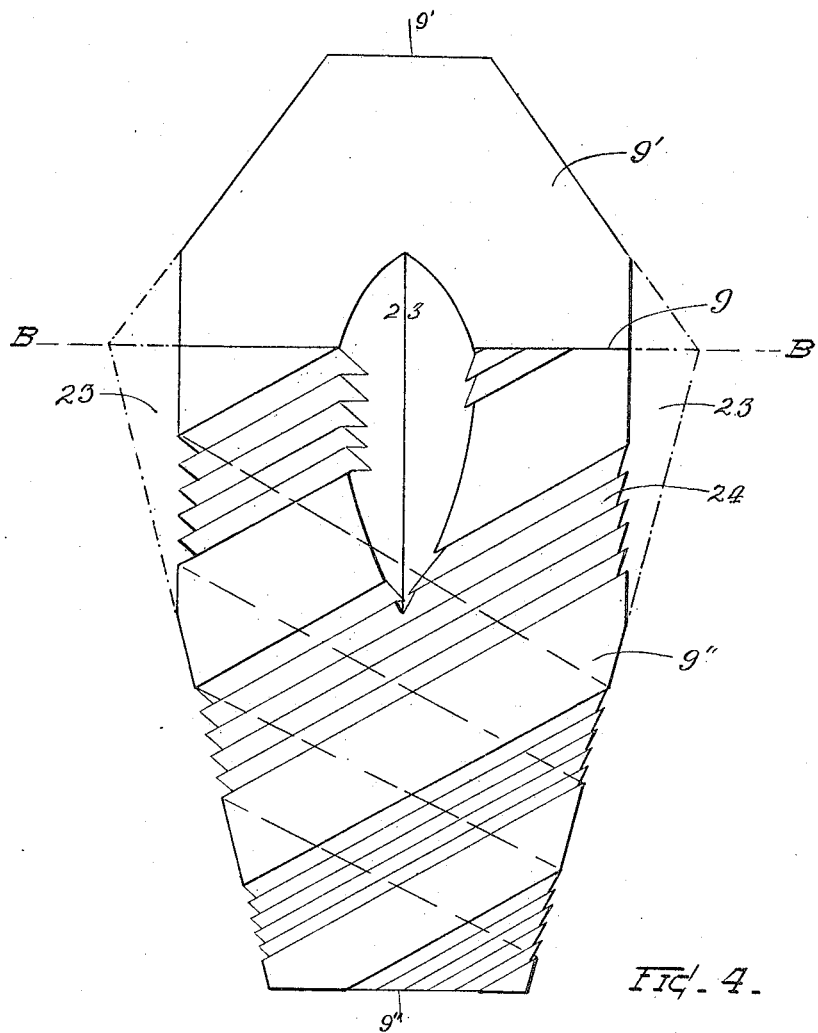

Figure 1 is an elevation of a machine embodying my invention, partly in section and in parts broken away; Fig. 2, a vertical cross section of the same, showing the outlet; Fig. 3, a plan view on the line A—A, Fig. 1; Fig. 4, a detail vertical view of the rotatable grinder removed from the machine and in an unfinished state; Fig. 5 is a plan taken on the line B—B of Fig. 4.

Similar characters refer to similar parts throughout the several views.

A grinding shell 1, supported on a suitable base 2, is covered on its top by a plate 3 which has an inlet 4 and a spout 5 to conduct the cereal to the interior of the shell 1.

My preferred form for the shell 1 comprises a cylindrical upper cavity 6 and a lower chamber 7, of frusto-conoidal form, uniting with the cavity 6 as one receptacle 8, on the line C—C, Fig. 1. Within the receptacle 8 I locate a revoluble vertical grinder 9 made of one piece but in the form of two frustums of cones, one forming the grinder's top, 9', reversed and superimposed on the other frusto-conoidal lower part 9'' on the line D—D, Fig. 1. The relative diameters of the chamber 7 and the grinder 9 are such that the plane of the line, D—D will be slightly below that of the line C—C, for reasons that will be hereinafter set forth.

A shaft 10 extends through the grinder 9, protrudes at both ends and is rigidly attached thereto and its top end is splined to a surrounding tube 11 with which it rotates and in which it can have vertical movement. The tube 11, rotates in and is upheld by a journal box, 11', attached to plate 3. The tube 11 may be rotated by bevel gears 12 and 13 actuated by a power shaft 14, or in any convenient manner.

The lower end of the shaft 10 is seated in a step box 15, made as a part of a bridge-tree 16, which is fulcrumed on a frame 2' rising from the base 2. A threaded rod 18 is swiveled on the other end, 19, of the bridge-tree 16. The top of the rod 18 passes through an ear 20, which is also made a part of the frame 2', and carries a lighter screw 21, by the manipulation of which the bridge-tree can be operated and the shaft 10 moved up or down to increase or decrease the space between the exterior surface of the grinder 9 and the interior surface of the chamber 7 below the line C—C, so as to grind or granulate the cereal to such a degree of coarseness or fineness as may be desired.

The bottom of the chamber 7 is left open so there may be nothing to retard the ground stock; thus preventing the making of soft, greasy or dusty flour, a percentage of which is made when a retarding plate is located at the end of a grinder or cutter. As a result of the backing up of the granules by such a plate a part of the gluten and protein is lost or is deteriorated as to quality. At the bottom of the chamber 7 I locate a discharge tube 22, Fig. 2.

Referring to Fig. 4, the top 9' of the grinder 9 is shaped as described and illustrated in order to form a pocket for the reception of the cereal entering the inlet 4. At the largest diameter of the grinder 9 I chamfer a plurality of flutings, 23, (preferably four) of lanceolate semi-ovoid form and of lengths greater than the combined widths of a plurality of spiral corrugations, 24, which I cut on the surface of the lower part 9'' of the grinder 9, in the following manner: Each of the corrugations lies between adjacent protruding threads which are beveled downwardly and inwardly on their lower faces and are cut horizontally on their upper faces, to provide cutting edges on their tops, as illustrated. Each pair of threads and their intermediate channel, forms a complete corrugated spiral from its starting point at its top to the bottom of the grinder 9; but instead of starting one corrugation at the top and carrying it in a continuous spiral touching its own last convolution to the bottom, I spread each successive turn of each corrugation downwardly sufficient to permit of starting a plurality of spirals, (from five to ten preferably, as may be required) downward parallel to and touching each other in groups, as illustrated in Fig. 4. As a result, a granule of the grinding cereal, instead of having to travel down a single corrugation cut continuously around the conoidal grinder, has to make only one fifth to one tenth of the laps of an ordinary spiral channel to reach the outlet 22'. In other words a plurality of granules are paralleling each other in their down and out course; and the granulated output of the grinder is multiplied by the number of individual channels, per revolution of the grinder, by my method of corrugating it. The flutings 23 serve to feed the granules of the cereals evenly and rapidly into the mouths of the corrugations' channels as they rotate into receptive position.

Those familiar with the art will recognize that I have invented a machine that will increase the output; grind the cereal without the formation of a percentage of mashed and broken granules, which means a proportionate loss of product; and that will increase the percentage of protein and gluten conserved in the flour from the middlings or cereal used.

I claim:—

1. In a device of the character described the combination with a grinder shell which is conoidal at its lower end, of a grinder core reversely conoidal at its opposite ends, said core being vertically fluted about its point of greatest diameter and having spiral corrugations arranged in groups about its lower conoidal end, said corrugations communicating with said flutings at their upper ends.

2. In a device of the character described the combination with a grinder shell which is conoidal at its lower end, of a grinder core reversely conoidal at its opposite ends, said core having a plurality of vertical flutings spaced about its point of greatest diameter and being spirally corrugated in such manner as to form a plurality of cutting ribs and said corrugations and ribs being arranged in groups, said corrugations communicating with the said flutings at their upper ends, said ribs being beveled inwardly on their under sides and presenting horizontal faces on the upper sides thereof.

3. In a device of the character described, the combination with a grinder shell of a shaft vertically disposed therein, a grinder core carried by said shaft, the opposite ends of said grinder core being formed as reverse cones, the lower portion of said grinder core having a plurality of spiral corrugations formed thereabout, and vertical flutings formed in the part of largest diameter of said grinder core, said flutings lying partly in the upper conoidal portion of said core, and partly in the lower conoidal portion thereof.

4. In a device of the character described the combination with a grinder shell of a conoidal grinder core, said grinder core being vertically fluted at its point of greatest diameter, and a plurality of groups of spiral corrugations about said core, which corrugations communicate with the said flutings at their upper ends.

5. In a device of the character described the combination of a grinder shell, of a grinder core reversely conoidal at its opposite ends, said core having a plurality of vertical flutings disposed about its point of greatest diameter and being provided with a plurality of groups of spirally arranged corrugations which form cutting ribs between them.

In testimony whereof I affix my signature in presence of two witnesses.

ELIAS L. ROMICK.

Witnesses:
 BESSE JONES,
 MARY L. RICE.

---

Copies of this patent may be obtained for five cents each, by addressing the "Commissioner of Patents, Washington, D. C."